United States Patent
Mohagheghi et al.

(10) Patent No.: US 9,171,256 B2
(45) Date of Patent: Oct. 27, 2015

(54) SYSTEMS AND METHODS FOR PREDICTING CUSTOMER COMPLIANCE WITH DEMAND RESPONSE REQUESTS

(75) Inventors: Salman Mohagheghi, Centennial, CO (US); Jean-Charles Tournier, Bellegrade (FR)

(73) Assignee: ABA Research Ltd., Zurich (CH)

( * ) Notice: Subject to any disclaimer, the term of this patent is extended or adjusted under 35 U.S.C. 154(b) by 222 days.

(21) Appl. No.: 13/991,591

(22) PCT Filed: Mar. 18, 2011

(86) PCT No.: PCT/US2011/028933
§ 371 (c)(1),
(2), (4) Date: Jun. 4, 2013

(87) PCT Pub. No.: WO2012/082173
PCT Pub. Date: Jun. 21, 2012

(65) Prior Publication Data
US 2013/0254151 A1    Sep. 26, 2013

Related U.S. Application Data

(60) Provisional application No. 61/424,319, filed on Dec. 17, 2010.

(51) Int. Cl.
| G06F 17/00 | (2006.01) |
| G06N 5/02 | (2006.01) |
| G06Q 30/06 | (2012.01) |
| H02J 3/14 | (2006.01) |
| H02J 3/00 | (2006.01) |

(52) U.S. Cl.
CPC .............. *G06N 5/02* (2013.01); *G06Q 30/0621* (2013.01); *H02J 3/14* (2013.01); *H02J 2003/003* (2013.01); *Y02B 70/3225* (2013.01); *Y04S 10/54* (2013.01); *Y04S 20/222* (2013.01); *Y04S 50/10* (2013.01)

(58) Field of Classification Search
None
See application file for complete search history.

(56) References Cited

U.S. PATENT DOCUMENTS

| 6,621,179 | B1 | 9/2003 | Howard | |
| 7,149,605 | B2 | 12/2006 | Chassin | |
| 7,478,070 | B2 | 1/2009 | Fukui | |
| 7,747,739 | B2 | 6/2010 | Bridges | |
| 7,844,370 | B2 | 11/2010 | Pollack | |
| 8,019,697 | B2 * | 9/2011 | Ozog | 705/412 |
| 8,364,609 | B2 | 1/2013 | Ozog | |
| 8,433,451 | B2 * | 4/2013 | Tournier et al. | 700/292 |
| 8,886,475 | B2 * | 11/2014 | Frei et al. | 702/58 |
| 9,008,809 | B2 * | 4/2015 | Tournier et al. | 700/82 |

(Continued)

OTHER PUBLICATIONS

Sentiment analysis of Hollywood movies on Twitter Hodeghatta, U.R. Advances in Social Networks Analysis and Mining (ASONAM), 2013 IEEE/ACM International Conference on Year: 2013 pp. 1401-1404 Referenced in: IEEE Conference Publications.*

(Continued)

*Primary Examiner* — Michael B Holmes
(74) *Attorney, Agent, or Firm* — Steven W. Hudnut

(57) ABSTRACT

Systems and methods for predicting customer compliance with requests to participate in demand response events are disclosed. The systems and methods may include receiving demand response information for a demand response event, receiving information for a customer, and determining or adjusting for the customer a compliance probability for the demand response event based at least partially on the demand response information and the received customer information.

20 Claims, 1 Drawing Sheet

(56) References Cited

U.S. PATENT DOCUMENTS

| | | |
|---|---|---|
| 2004/0158360 A1 | 8/2004 | Garland |
| 2005/0027636 A1 | 2/2005 | Gilbert |
| 2009/0066287 A1 | 3/2009 | Pollack |
| 2009/0187445 A1 | 7/2009 | Barclay |
| 2010/0017045 A1 | 1/2010 | Nesler |
| 2010/0088261 A1 | 4/2010 | Montalvo |
| 2010/0114387 A1 | 5/2010 | Chassin |
| 2010/0138066 A1 | 6/2010 | Kong |
| 2010/0235004 A1 | 9/2010 | Thind |
| 2011/0035073 A1 | 2/2011 | Ozog |
| 2011/0196546 A1 | 8/2011 | Muller |
| 2011/0231028 A1 | 9/2011 | Ozog |
| 2012/0023058 A1* | 1/2012 | Mohagheghi et al. .......... 706/52 |
| 2013/0085624 A1 | 4/2013 | Yang |
| 2013/0173331 A1* | 7/2013 | Mohagheghi et al. ....... 705/7.25 |
| 2013/0254151 A1* | 9/2013 | Mohagheghi et al. .......... 706/46 |
| 2014/0285154 A1 | 9/2014 | Mohagheghi |
| 2014/0316598 A1 | 10/2014 | Yang |

OTHER PUBLICATIONS

Bayesian Filters for Mobile Recommender Systems Saravanan, M.; Buveneswari, S.; Divya, S.; Ramya, V. Advances in Social Networks Analysis and Mining (ASONAM), 2011 International Conference on Year: 2011 pp. 715-721, DOI: 10.1109/ASONAM.2011.51 Referenced in: IEEE Conference Publications.*

Deriving factors influencing the acceptance of Pad Phones by using the DNP based UTAUT2 framework Chi-Yo Huang; Yu-Sheng Kao; Ming-Jenn Wu; Gwo-Hshiung Tzeng Technology Management in the IT-Driven Services (PICMET), 2013 Proceedings of PICMET '13: Year: 2013 pp. 880-887 Referenced in: IEEE Conference Publications.*

Application of Neural Networks for Data Modeling of Power Systems with Time Varying Nonlinear Loads Mazumdar, J.; Venayagamoorthy, G.K.; Harley, R.G. Computational Intelligence and Data Mining, 2007. CIDM 2007. IEEE Symposium on Year: 2007 pp. 705-711, DOI: 10.1109/CIDM.2007.368945 Referenced in: IEEE Conference Publications.*

L. Young, International Searching Authority (US), International Search Report and Written Opinion of the International Searching Authority for corresponding International Application No. PCT/US2011/028933, United States Patent Office, mailed Oct. 31, 2011.

"Demand Response, An Introduction," Rocky Mountain Institute, Boulder, Colorado, Apr. 30, 2006.

S. Grover, "Market Penetration: How to Predict the Future," ACEEE, 1998.

S. Mecum, "A Wish List for Residential Direct Loan Control Customers," ACEEE, 2002.

X. Fang, S. Misra, G. Xue, D Yang, "Smart Grid—The New and Improved Power Grid: A Survey," 2011, from http://www.public.asu.edu/~xfang5/survey_smartgrid_2011.pdf.

IEEE Xplore Abstract for X. Fang, S. Misra, G. Xue, D Yang, "Smart Grid—The New and Improved Power Grid: A Survey," printed Apr. 25, 2014.

X. Fang, S. Misra, G. Xue, D Yang, "Smart Grid—The New and Improved Power Grid: A Survey," IEEE Communications Surveys & Tutorials, vol. 14, No. 4, Fourth Quarter 2012, pp. 944-980.

* cited by examiner

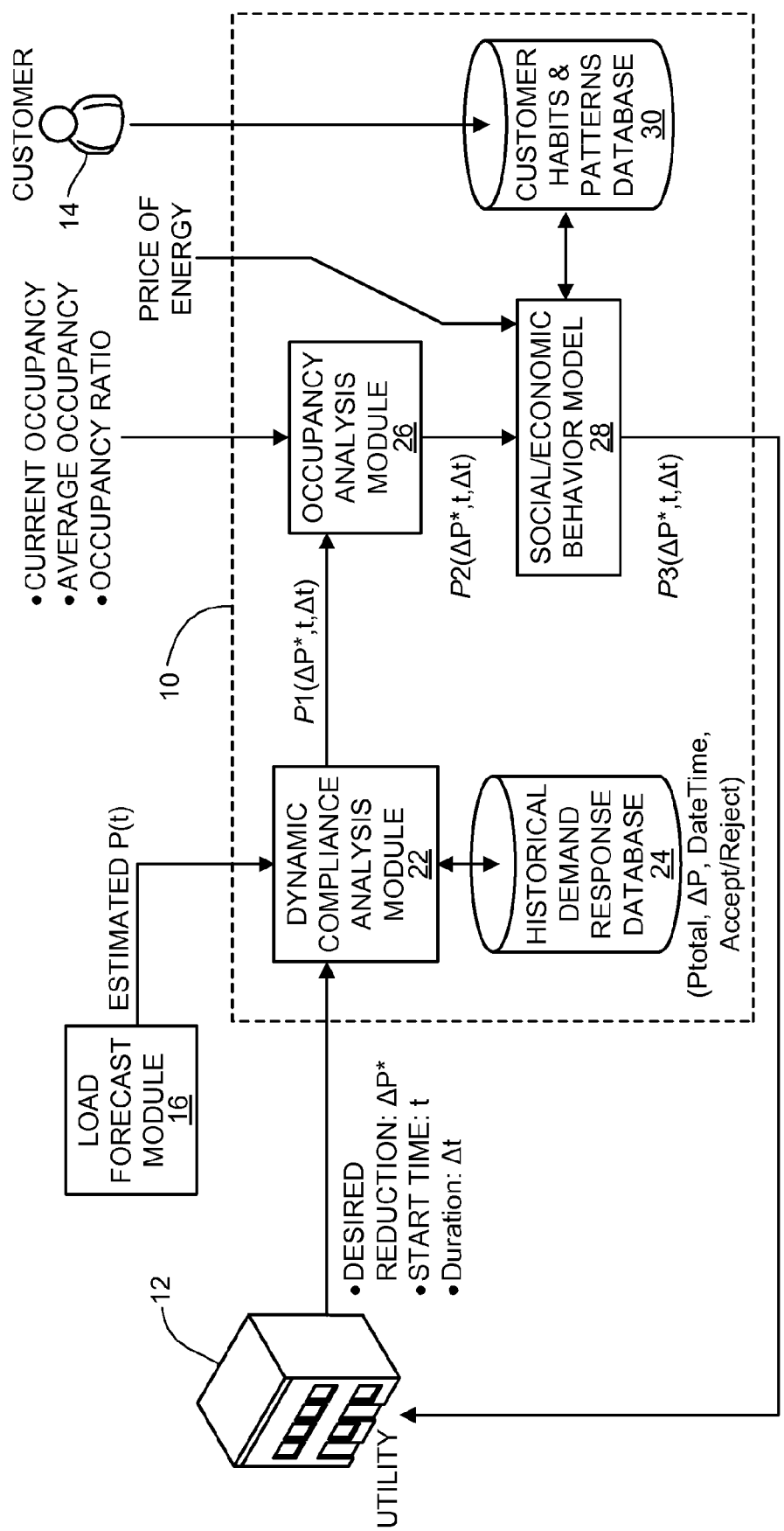

SYSTEMS AND METHODS FOR PREDICTING CUSTOMER COMPLIANCE WITH DEMAND RESPONSE REQUESTS

CROSS REFERENCE TO RELATED APPLICATION(S)

This application claims the benefit of U.S. Provisional Patent Application Ser. No. 61/424,319, which was filed on Dec. 17, 2010 and is entitled "Systems and Methods for Predicting Customer Compliance with Demand Response Requests." The complete disclosure of the above-identified patent application is hereby incorporated by reference for all purposes.

FIELD OF THE DISCLOSURE

The present disclosure relates to demand response events, and more particularly to predicting customer compliance with requests to participate in demand response events.

BACKGROUND

Demand response (DR) may refer to actions taken by a utility and/or its customers to temporarily reduce the peak electricity demand at some time in the future. Demand response may be implemented by the utility sending demand reduction or response requests or signals to some customers or by the utility accepting demand reduction bids initiated by the customers. In some examples, demand response operations may be based on a contract between the utility and its customers, with the contract providing incentives for customer compliance with demand response requests and/or possible penalties for noncompliance with demand response requests.

A device for curtailing electric demand for responding to the real-time pricing of electrical energy or for reducing demand during power shortages is disclosed in U.S. Pat. No. 6,621,179. Electrical power distribution control methods, electrical energy demand monitoring methods, and power management devices are disclosed in U.S. Pat. No. 7,149,605. A method and apparatus for trading energy demand and supply response commitments is disclosed in U.S. Patent Application Publication No. US 2005/0027636. The disclosures of these and all other publications referenced herein are incorporated by reference in their entirety for all purposes.

SUMMARY

In some examples, methods for predicting customer compliance with requests to participate in demand response events may include receiving demand response information for a demand response event, receiving behavioral information for the customer, and determining for the customer a compliance probability for the demand response event based at least partially on the demand response information and the behavioral information.

In some examples, methods for predicting customer compliance with requests to participate in demand response events may include receiving demand response information for a demand response event, receiving status information for the customer, and determining for the customer a compliance probability for the demand response event based at least partially on the demand response information and the status information.

In some examples, methods for predicting customer compliance with requests to participate in demand response events may include receiving response information for a demand response event, receiving historical information regarding a customer's compliance with demand response requests, comparing the historical information to the response information to determine a compliance probability, receiving predictive information for the customer, and adjusting the compliance probability for the customer based at least partially on the predictive information.

BRIEF DESCRIPTION OF DRAWINGS

FIG. 1 is a functional block diagram illustrating a nonexclusive illustrative example of a system for predicting customer compliance with a request to participate in a demand response event.

DETAILED DESCRIPTION

In a utility-initiated demand response event, a utility may transmit or otherwise send to one or more of the utility's users or customers a demand response request, which is a request to participate in the demand response event. The demand response request may be in the form of demand response signals, which may include appropriate demand response information for an upcoming demand response event. The demand response information for a demand response event may include any suitable combination of a desired demand or load reduction, a start time, a duration, and an end time. The customers a utility selects as candidates for participation in a demand response event may depend on criteria such as the customers' contracts, the physical locations of the customers, a network model, or the like.

The overall success of a demand response event may depend on the rate at which customers comply with the demand response request. A successful demand response event may occur when a sufficient number of customers comply with requests to reduce their consumption by a given amount for a given duration. Thus, for example, a relatively higher customer compliance rate may lead to a successful or sufficient demand response, while a relatively lower customer compliance rate may result in an unsuccessful or insufficient demand response.

In some examples, the customer compliance rate, and correspondingly the success of the demand response event, cannot be determined or verified in advance. In such examples, the utility does not know whether a given demand response event will be successful until the event starts, and the utility is then able to determine whether or not the targeted customers have complied with the demand response request signals. As may be understood, if the utility cannot determine that there has been sufficient compliance until after the demand response event begins, the utility may be forced to send short-notice demand response requests to a new group of customers, which may lead to higher incentive payments and/or insufficient resources for the demand response event. However, estimating a probability that a given customer will comply with a particular demand response request may permit a utility to identify or select for participation in a demand response event those customers who are relatively more likely to comply with the demand response request, which may reduce the likelihood of an insufficient demand response and the resulting need for short-notice demand response requests.

A utility or other entity may select customers for participation in a particular demand response event by identifying a group of customers for possible participation in the demand response event. Selection of customers for membership in the group may be based on any suitable criteria such as physical and/or economic constraints. Nonexclusive illustrative examples of physical constraints include factors such as network topology and customer location. Nonexclusive illustrative examples of economic constraints include factors such as the contractually established incentives for various customers.

Once a group of customers has been identified for possible participation, a subset of the customers from the group may be selected as candidates to receive a request to participate in the demand response event. In some examples, the subset of customers may be selected based on those customers having a relatively higher likelihood of accepting and/or complying with a demand response request for a particular demand response event. Accordingly, and as set out in more detail below, the utility or other entity may determine a compliance probability for each customer in the group based on any suitable criteria. In some examples, the determined compliance probabilities for the customers in the group may be adjusted or tuned based on one or more additional criteria, such as those set out below.

The utility or other entity may rank and/or select particular customers from the group to receive requests to participate in the demand response event. In some examples, the utility or other entity may select those customers in the group that it determines would be relatively more likely to accept and/or comply with the demand response request than would other customers in the group. For example, the utility or other entity may select higher ranked ones of the customers and/or select the customers in the group for which the compliance probability is above a predetermined threshold.

The predetermined threshold may correspond to any criteria suitable to identify or predict which customers may be more likely to accept and/or comply with the demand response request. For example, the predetermined threshold may be an absolute criteria such as a particular percentage predicted and/or adjusted likelihood that the customer will accept and/or comply with the demand response request, such as greater than about 25%, 50%, 75%, 85% or even 90%. In some examples, the predetermined threshold may be a relative criteria, such as where the utility or other entity selects a first subset of the customers who have a higher predicted and/or adjusted likelihood that they will respond to and comply with the demand response request than do the customers within a second subset.

The following paragraphs describe nonexclusive illustrative examples of methods for predicting customer compliance with requests to participate in demand response events, using the concepts and components disclosed herein. Although the actions of the disclosed methods may be performed in the order in which they are presented below, it is within the scope of this disclosure for the actions, either alone or in various combinations, to be performed before and/or after any of the other actions.

In some examples, methods for predicting customer compliance with a request to participate in a demand response event may include receiving demand response information for a demand response event, receiving information for a customer, and determining for the customer a compliance probability for the demand response event based at least partially on the demand response information and the information received for the customer.

The information received for a customer may include predictive information for the customer; the customer's predicted or forecasted load or energy consumption level P(t) at the starting time t of the demand response event under consideration; and/or historical information regarding the customer's response to, and/or or compliance with, prior requests to participate in demand response events, such as those similar to the demand response event under consideration. In some examples, the predictive information for the customer may include behavioral and/or status information for the customer.

The predictive information for the customer may be determined based on observations and/or measurements and/or it may be received from the customer. For example, a utility may collect surveys or questionnaires from its customers that inquire as to the customers' behavioral and/or status patterns.

The behavioral information for the customer may include information about the customer's social and/or economic behavior, habits and patterns. In some examples, the behavioral information may include or be information provided by the customer, such as by way of surveys or questionnaires that may have been provided when the customer entered into a contract with the utility. In some examples, the behavioral information may include or be information determined based on inspections or observations of the customer's site and/or on observations of the customer's behavior over time.

The behavioral information may include and/or be used to determine the customer's preferences regarding demand response participation time periods during which the customer may be more or less amenable to compliance with a demand response request due to the customer's social behavior, habits and patterns. Such time periods may be hours, days, weeks, or even months. In some examples, the time periods may recur at regular or irregular intervals, such as, for example, daily, weekly, or even monthly or yearly. By way of non-limiting examples, the behavioral information for a particular customer may indicate that the customer is a sports fan who would be unlikely to comply with a demand response request for a demand response event scheduled during certain sporting events, that the customer likes to entertain guests in the evening and would be unlikely to comply with a demand response request for a demand response event scheduled during evening hours, or that the customer is relatively less sensitive to hot weather and would be more likely to comply with a demand response request during summer afternoons than would other people who are using their A/C at high levels on summer afternoons.

The behavioral information may include and/or be used to determine the customer's economic behavior, habits and patterns. For example, the behavioral information may include or be used to determine the customer's sensitivity to energy prices and fluctuations thereof, as well as how the customer reacts and/or alters his or her behavior in view of the same, such as by reducing consumption when energy prices are high. By way of non-limiting example, the behavioral information may indicate that the customer will be more likely to comply with a demand response request during times of high energy prices and/or high incentive payments awarded for participation in demand response events. In some examples, information regarding the customer's economic behavior, habits and patterns may be determined or estimated based on whether the customer's site includes energy saving devices such as intelligent switches that turn off or reduce use of various devices when energy prices are high.

The status information for the customer may include a current occupancy, an average occupancy, and an occupancy ratio. The current and average occupancies for a customer may correspond to the number of persons present at a customer site. The current occupancy may refer to the number of persons present at a particular analysis time, the expected number of persons who will be present at the starting time t of an expected demand response event that is under consideration, or even the expected number of persons who will be present at a particular time of day, week, month and/or year. The average occupancy for the customer may be the average number of persons who are present at the customer site over a given period of time and/or at a particular time of day, week, month and/or year. In examples where the customer site is a place of residence, the average occupancy may be defined as the number of persons, or even the number of adults, in the household associated with the place of residence.

The occupancy ratio may be determined under or for any suitable condition or time. For example, the occupancy ratio may be the ratio of the current occupancy to the average occupancy. In some examples, the occupancy ratio may be calculated as the ratio of the current occupancy to the average occupancy for a particular time of day, week, month and/or year.

For the purposes of predicting customer compliance with demand response requests based on an occupancy ratio, an occupancy ratio for a particular time period that is greater than one may indicate that the customer will have a relatively lower likelihood of complying with a demand response request. For example, an occupancy ratio greater than one may indicate that the customer is hosting guests and may thus be unwilling or unable to reduce energy consumption at that time.

In contrast, an occupancy ratio for a particular time period that is less than one may indicate that the customer will have a relatively higher likelihood of complying with a demand response request. For example, an occupancy ratio that is less than one may indicate that some of the customer's family members are away from home, in which case the customer may be relatively more willing or able to reduce energy consumption at that time.

However, in examples where the occupancy ratio is very low, such as close to or even zero, the customer may be unlikely to respond to the demand response request because a very low occupancy ratio may indicate that there will be no one available at the customer site to respond to the demand response request. For example, a very low occupancy ratio may indicate that all members of a household are away from home.

In some examples, methods for predicting customer compliance with a request to participate in a demand response event may include receiving demand response information for a demand response event, receiving historical information regarding a customer's response to or compliance with prior demand response requests, and comparing the historical information to the response information to determine a compliance probability. For example, the likelihood that a customer will respond to, accept, and/or comply with a demand response request may be determined based on the customer's history of compliance with past instances of relatively similar demand response requests, such as requests to participate in demand response events of similar duration and/or at similar times of day, week, month, and/or year.

However, in some examples, the historical information for a particular customer may not be sufficient to provide a reliable statistical prediction as to whether the customer will comply with a particular demand response request. In particular, the number of prior demand response requests sent to a given customer, and more particularly the number of requests that were relatively recent, such as within the prior year, and/or were relatively similar to a given upcoming request, may be not be sufficient to provide a reliable statistical prediction of the customer's compliance. Thus, a compliance probability determined for the customer by comparing the historical information to the response information may provide a base probability, which may then be adjusted or modified based at least partially on predictive information received for the customer, such as behavioral and/or status information.

A nonexclusive illustrative example of a system 10 for predicting customer compliance with a request to participate in a demand response event, such as by implementing the methods disclosed herein, is illustrated by way of the functional block diagram shown in FIG. 1. Although discussed as functional blocks, it should be understood that the system 10 may be implemented in hardware, software, firmware or a combination thereof, such as where a controller includes a processor that executes a plurality of machine-readable instructions that are embodied on a computer readable storage medium. Unless otherwise specified, the system 10 may, but is not required to, contain at least one of the structures, components, functionalities, and/or variations described, illustrated, and/or incorporated herein. Inputs to the system 10 may come from, for example, a utility 12, a customer 14, and/or a load forecast module 16. The illustrated system 10 includes a dynamic compliance analysis module 22, an historical demand response database 24, an occupancy analysis module 26, a social and/or economic behavior module 28, and a customer habits and patterns database 30.

With reference to FIG. 1, when preparing for or planning a demand response event, the utility 12 may desire to determine a probability that a particular customer 14 will comply with a request to participate in the demand response event.

The dynamic compliance analysis module 22 receives input from the utility 12, the load forecast module 16, and the historical demand response database 24, and outputs an estimated or base compliance probability $P1(\Delta P^*, t, \Delta t)$ that the customer 14 will respond to or comply with a particular demand response request and reduce its load by $\Delta P^*$ at a start time t for a duration $\Delta t$. The utility 12 provides demand response information, which may include the desired load reduction $\Delta P^*$, the start time t, and the duration $\Delta t$ for the demand response event. The desired load reduction $\Delta P^*$, the start time t, and/or the duration $\Delta t$ for the demand response event may be specific to a particular customer or may be applicable to multiple customers within an identified group. The load forecast module 16 provides an estimated energy consumption level P(t) for the customer 14 at the start time t. The historical demand response database 24 may provide the characteristics of past demand response requests sent to the customer 14 in addition to the customer's responses to and/or compliance, or lack thereof, with those demand response requests. The characteristics may include the customer's total load level (Ptotal) during each prior demand response request sent to the customer 14, the desired load reduction level ($\Delta P$) for the customer 14 during each prior demand response request sent to the customer 14, the time of day, week, month and/or year and duration (DateTime) for each prior demand response request sent to the customer 14, and whether or not the customer 14 responded to or complied with each prior demand response request sent to the customer 14 (Accept/Reject). The dynamic compliance analysis module 22 may estimate the base compliance probability $P1(\Delta P^*, t)$ for the customer 14 by comparing the demand response information received from the utility 12 to the historical data for the customer 14 that is contained in the historical demand response database 24.

The base compliance probability $P1(\Delta P^*, t, \Delta t)$ for the customer 14 may be adjusted or tuned by the occupancy analysis module 26 to produce a revised compliance probability $P2(\Delta P^*, t, \Delta t)$. The occupancy analysis module 26 may receive status information as input, including the current occupancy, the average occupancy, and/or the occupancy ratio for the customer 14. The base compliance probability P1(ΔP*,t,Δt) for the customer 14 may be adjusted or tuned in view of the occupancy ratio, as generally set out above.

The revised compliance probability P2(ΔP*,t,Δt) for the customer 14 may then be further adjusted or tuned by the social and/or economic behavior module 28 to produce a final predicted compliance probability P3(ΔP*,t,Δt). The social and/or economic behavior module 28 may receive input in the form of energy price information, as well as behavioral information regarding the customer's social and/or economic behavior, habits and patterns, which may be received from the customer habits and patterns database 30 and may have been provided or input by the customer 14. The revised compliance probability P2(ΔP*,t,Δt) may be adjusted or tuned in view of the behavioral information, as generally set out above and output to the utility 12 as the final predicted compliance probability P3(ΔP*,t,Δt).

As may be understood, the disclosed systems and methods may predict the probability that a given customer will respond to, accept, and/or comply with a specific demand response request based on the customer's past behavior and/or information regarding the customer's social and/or economic behavior and habits. Based on the predictions, the utility may select and/or rank the customers to which a demand response signal should be sent, which may improve the likelihood of a successful or sufficient demand response operation.

The disclosed methods and systems may be embodied as or take the form of the methods and systems previously described, as well as of a transitory or non-transitory computer readable medium having a plurality of machine- or computer-readable instructions stored thereon that, when executed by a processor, carry out operations of the disclosed methods and systems. The computer-readable medium may be any medium that can contain, store, communicate, propagate, or transport the user-interface program instruction for use by or in connection with the instruction execution system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method for predicting customer compliance with a request to participate in a demand response event, the method comprising:
receiving demand response information for a demand response event;
receiving behavioral information for a customer, wherein the behavioral information comprises information about the customer's social habits; and
determining for the customer a compliance probability for the demand response event based at least partially on the demand response information and the behavioral information.

2. The method of claim 1, wherein the demand response information comprises a start time and a duration, and the information about the customer's social habits comprises the customer's preferences regarding demand response participation time periods.

3. The method of claim 1, wherein the customer has a current occupancy and an average occupancy, the method comprises receiving a ratio of the current occupancy to the average occupancy, and the compliance probability is based at least partially on the occupancy ratio.

4. The method of claim 1, wherein the behavioral information comprises price-sensitivity information for the customer.

5. The method of claim 1, wherein the customer has a current occupancy and an average occupancy, and the compliance probability is determined based at least partially on a ratio of the current occupancy to the average occupancy.

6. The method of claim 1, comprising receiving historical information regarding the customer's response to prior requests to participate in demand response events, wherein the compliance probability is based at least partially on the historical information.

7. The method of claim 1, incorporated into a method for selecting customers for participation in the demand response event, the method for selecting customers for participation in the demand response event comprising:
identifying a group of customers for possible participation in the demand response event;
determining the compliance probability for each customer in the group; and
selecting for participation in the demand response event the customers for which the compliance probability is above a predetermined threshold.

8. A method for predicting customer compliance with a request to participate in a demand response event, the method comprising:
receiving demand response information for a demand response event;
receiving status information for a customer, wherein the customer has a current occupancy and an average occupancy, and the status information comprises a ratio of the current occupancy to the average occupancy; and determining for the customer a compliance probability for the demand response event based at least partially on the demand response information and the status information.

9. The method of claim 8, comprising receiving behavioral information for the customer, wherein the compliance probability is based at least partially on the behavioral information.

10. The method of claim 9, wherein the behavioral information comprises information about the customer's social habits.

11. The method of claim 10, wherein the demand response information comprises a start time and a duration, and the information about the customer's social habits comprises the customer's preferences regarding demand response participation time periods.

12. The method of claim 9, wherein the behavioral information comprises price-sensitivity information for the customer.

13. The method of claim 8, comprising receiving historical information regarding the customer's response to prior requests to participate in demand response events, wherein the compliance probability is based at least partially on the historical information.

14. The method of claim 8, incorporated into a method for selecting customers for participation in the demand response event, the method for selecting customers for participation in the demand response event comprising:
    identifying a group of customers for possible participation in the demand response event;
    determining the compliance probability for each customer in the group; and
    selecting for participation in the demand response event those customers in the group for which the compliance probability is above a predetermined threshold.

15. A method for predicting customer compliance with a request to participate in a demand response event, the method comprising:
    receiving response information for a demand response event;
    receiving historical information regarding a customer's compliance with demand response requests;
    comparing the historical information to the response information to determine a compliance probability;
    receiving predictive information for the customer, wherein the predictive information includes at least one of status information for the customer and behavioral information for the customer; and
    adjusting the compliance probability for the customer based at least partially on the predictive information.

16. The method of claim 15, wherein the response information includes at least one of a desired load reduction, a start time and a duration.

17. The method of claim 15, wherein the behavioral information is provided by the customer.

18. The method of claim 15, wherein the customer has a current occupancy and an average occupancy, and the predictive information comprises a ratio of the current occupancy to the average occupancy.

19. The method of claim 15, wherein the predictive information comprises price-sensitivity information for the customer.

20. The method of claim 15, incorporated into a method for selecting customers for participation in the demand response event, the method for selecting customers for participation in the demand response event comprising:
    identifying a group of customers for possible participation in the demand response event;
    determining and adjusting the compliance probability for each customer in the group; and
    selecting for participation in the demand response event the customers for which the compliance probability is above a predetermined threshold.

\* \* \* \* \*